(12) United States Patent
Parekh

(10) Patent No.: US 10,728,302 B2
(45) Date of Patent: *Jul. 28, 2020

(54) DYNAMIC BIT RATE ENCODING

(71) Applicant: Google LLC, Mountain View, CA (US)

(72) Inventor: Neel B. Parekh, San Francisco, CA (US)

(73) Assignee: Google LLC, Mountain View, CA (US)

( * ) Notice: Subject to any disclaimer, the term of this patent is extended or adjusted under 35 U.S.C. 154(b) by 351 days.

This patent is subject to a terminal disclaimer.

(21) Appl. No.: 15/394,369

(22) Filed: Dec. 29, 2016

(65) Prior Publication Data

US 2017/0111422 A1    Apr. 20, 2017

Related U.S. Application Data

(63) Continuation of application No. 13/607,520, filed on Sep. 7, 2012, now Pat. No. 9,560,392.

(51) Int. Cl.
*G10L 19/00* (2013.01)
*H04L 29/04* (2006.01)
(Continued)

(52) U.S. Cl.
CPC ........ *H04L 65/607* (2013.01); *H04L 41/0896* (2013.01); *H04L 65/4092* (2013.01); *H04L 67/42* (2013.01); *H04N 21/23424* (2013.01); *H04N 21/234345* (2013.01); *H04N 21/44016* (2013.01); *H04N 21/472* (2013.01);
(Continued)

(58) Field of Classification Search
CPC ............................. H04L 65/607; H04L 67/42
See application file for complete search history.

(56) References Cited

U.S. PATENT DOCUMENTS 7,305,694 B2    12/2007 Commons et al.
7,984,174 B2 *  7/2011 Rideout .............. H04L 12/1822
                                                            709/230
(Continued)

OTHER PUBLICATIONS

Non-Final Office Action dated Apr. 8, 2016 as received in U.S. Appl. No. 13/607,520.

(Continued)

*Primary Examiner* — Kevin T Bates
*Assistant Examiner* — Mark A Scott
(74) *Attorney, Agent, or Firm* — Byrne Poh LLP

(57) ABSTRACT

Systems and methods for performing bit rate encoding are described. One of the methods includes receiving data indicating a change in a first connection speed that is associated with a first network. The change generates a second connection speed. The method further includes determining whether a media file is being downloaded. The method also includes determining that a current segment of the media file is being downloaded. The current segment is downloaded at a first bit rate and the first bit rate is associated with the first connection speed. The method includes determining whether the media file includes a remaining segment to be downloaded. The current segment precedes the remaining segment. The method includes identifying a second bit rate based on the second connection speed, receiving the remaining segment at the second bit rate, and stitching the remaining segment with the current segment.

18 Claims, 11 Drawing Sheets

(51) Int. Cl.
  *H04L 1/06* (2006.01)
  *H04L 29/06* (2006.01)
  *H04N 21/2343* (2011.01)
  *H04N 21/44* (2011.01)
  *H04N 21/472* (2011.01)
  *H04N 21/647* (2011.01)
  *H04N 21/845* (2011.01)
  *H04N 21/234* (2011.01)
  *H04L 12/24* (2006.01)

(52) U.S. Cl.
  CPC . *H04N 21/64753* (2013.01); *H04N 21/64769* (2013.01); *H04N 21/64792* (2013.01); *H04N 21/8456* (2013.01)

(56) References Cited

U.S. PATENT DOCUMENTS

| | | | |
|---|---|---|---|
| 7,991,904 | B2 | 8/2011 | Melnyk et al. |
| 8,291,460 | B1* | 10/2012 | Peacock ............... H04N 7/188 725/90 |
| 8,533,166 | B1 | 9/2013 | Sulieman et al. |
| 9,172,982 | B1 | 10/2015 | Kizhepat et al. |
| 2006/0095401 | A1* | 5/2006 | Krikorian ........... H04N 21/4398 |
| 2006/0095472 | A1 | 5/2006 | Krikorian et al. |
| 2007/0005795 | A1* | 1/2007 | Gonzalez ........... G06F 17/30017 709/232 |
| 2007/0038773 | A1 | 2/2007 | White et al. |
| 2007/0076756 | A1* | 4/2007 | Chan ................ H04N 21/2402 370/468 |
| 2007/0162568 | A1* | 7/2007 | Gupta ................ G06Q 30/0242 709/219 |
| 2007/0165572 | A1 | 7/2007 | Lenzarini |
| 2007/0226365 | A1 | 9/2007 | Hildreth et al. |
| 2007/0260679 | A1* | 11/2007 | Kikuchi ........... H04L 29/06027 709/203 |
| 2008/0022005 | A1 | 1/2008 | Wu et al. |
| 2008/0034393 | A1 | 2/2008 | Crayford |
| 2008/0072264 | A1 | 3/2008 | Crayford |
| 2008/0077262 | A1 | 3/2008 | Davis |
| 2008/0167865 | A1* | 7/2008 | Yamanashi ............ G10L 19/24 704/226 |
| 2009/0055550 | A1 | 2/2009 | Way et al. |
| 2009/0150557 | A1* | 6/2009 | Wormley ......... H04N 21/23424 709/231 |
| 2009/0254657 | A1 | 10/2009 | Melnyk et al. |
| 2009/0259756 | A1 | 10/2009 | Karlsson et al. |
| 2009/0282077 | A1 | 11/2009 | Thomas |
| 2009/0304028 | A1 | 12/2009 | Sharif-Ahmadi et al. |
| 2010/0058405 | A1 | 3/2010 | Ramakrishnan |
| 2010/0121977 | A1 | 5/2010 | Kontola et al. |
| 2010/0128664 | A1 | 5/2010 | Denny et al. |
| 2010/0150102 | A1 | 6/2010 | Li et al. |
| 2010/0158101 | A1* | 6/2010 | Wu ..................... H04N 19/115 375/240.01 |
| 2010/0161825 | A1 | 6/2010 | Ronca et al. |
| 2010/0146145 | A1 | 7/2010 | Tippin et al. |
| 2010/0205318 | A1 | 8/2010 | Menlyk et al. |
| 2010/0246534 | A1* | 9/2010 | Vargantwar ........ H04W 36/385 370/332 |
| 2010/0299552 | A1 | 11/2010 | Schlack et al. |
| 2010/0316126 | A1 | 12/2010 | Chen et al. |
| 2010/0318600 | A1 | 12/2010 | Furbeck |
| 2011/0010748 | A1 | 1/2011 | Asami |
| 2011/0093605 | A1* | 4/2011 | Choudhury ............. H04L 67/22 709/231 |
| 2011/0153856 | A1* | 6/2011 | Piepenbrink ........ H04L 47/2416 709/231 |
| 2011/0225302 | A1* | 9/2011 | Park .................... H04L 65/4084 709/227 |
| 2011/0225417 | A1 | 9/2011 | Maharajh et al. |
| 2011/0246622 | A1 | 10/2011 | Pantos et al. |
| 2011/0258322 | A1* | 10/2011 | Luzzatti ................ H04L 47/765 709/226 |
| 2011/0268428 | A1* | 11/2011 | Chen ....................... H04L 65/80 386/345 |
| 2011/0276864 | A1* | 11/2011 | Oules ..................... G06F 16/40 715/202 |
| 2011/0296046 | A1 | 12/2011 | Arya et al. |
| 2011/0314095 | A1* | 12/2011 | Gupta .............. H04N 21/23412 709/203 |
| 2012/0004960 | A1* | 1/2012 | Ma ..................... G06Q 30/0241 705/14.4 |
| 2012/0047230 | A1* | 2/2012 | Begen ................ H04L 65/4092 709/219 |
| 2012/0062793 | A1 | 3/2012 | Vanderhoff |
| 2012/0144445 | A1 | 6/2012 | Bonta et al. |
| 2012/0179833 | A1 | 7/2012 | Kenrick et al. |
| 2012/0185570 | A1 | 7/2012 | Bouazizi et al. |
| 2012/0254917 | A1* | 10/2012 | Burkitt ............. G06F 17/30817 725/40 |
| 2012/0265901 | A1* | 10/2012 | Swenson ............. H04L 65/1076 709/246 |
| 2012/0309397 | A1 | 12/2012 | Rao et al. |
| 2012/0317308 | A1* | 12/2012 | Penner ................ H04L 65/4092 709/239 |
| 2013/0013803 | A1 | 1/2013 | Bichot et al. |
| 2013/0031211 | A1 | 1/2013 | Johnson et al. |
| 2013/0044801 | A1 | 2/2013 | Cote et al. |
| 2013/0060904 | A1 | 3/2013 | Ur |
| 2013/0080268 | A1 | 3/2013 | Gordon et al. |
| 2013/0182705 | A1* | 7/2013 | Avni ................ H04N 21/23439 370/389 |
| 2013/0185452 | A1 | 7/2013 | Burckart et al. |
| 2013/0223509 | A1* | 8/2013 | Tweedale ......... H04N 21/23418 375/240.01 |
| 2013/0229270 | A1 | 9/2013 | Srinivasan et al. |
| 2013/0232232 | A1 | 9/2013 | Reza |
| 2013/0236158 | A1 | 9/2013 | Lynch et al. |
| 2013/0326024 | A1 | 12/2013 | Chen et al. |
| 2013/0332620 | A1 | 12/2013 | Gahm et al. |
| 2014/0013376 | A1 | 1/2014 | Xu et al. |
| 2014/0019633 | A1 | 1/2014 | Zhang et al. |
| 2014/0032658 | A1 | 1/2014 | Falls |
| 2014/0040496 | A1* | 2/2014 | Moorthy ............. H04L 65/4084 709/231 |
| 2014/0040498 | A1* | 2/2014 | Oyman .............. H04W 65/4084 709/231 |
| 2014/0079014 | A1 | 3/2014 | Lee |
| 2014/0149603 | A1 | 5/2014 | Park et al. |
| 2014/0156863 | A1 | 6/2014 | Gao et al. |
| 2014/0241415 | A1 | 8/2014 | Su et al. |

OTHER PUBLICATIONS

PCT International SR and WO of the International Searching Authority (ISA) issued in Int'nl Application No. PCT/US2013/044715, EPO, dated Nov. 4, 2013.

Ying Chen et al., "DASH Evaluation Experiment #7: Seamless Switching (SES)" 94. MPEG Meeting, Oct. 28, 2010, 18 pages.

Notice of Allowance dated Sep. 19, 2016 in U.S. Appl. No. 13/607,520.

Office Action dated Mar. 4, 2012 in U.S. Appl. No. 13/607,520.
Office Action dated May 21, 2015 in U.S. Appl. No. 13/607,520.
Office Action dated Oct. 2, 2014 in U.S. Appl. No. 13/607,520.

* cited by examiner

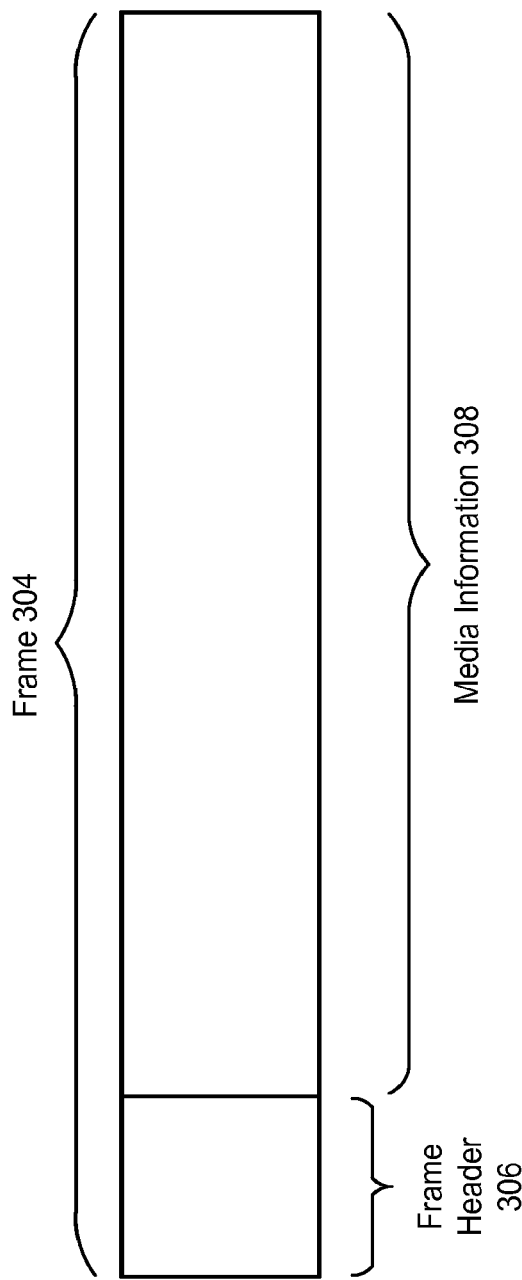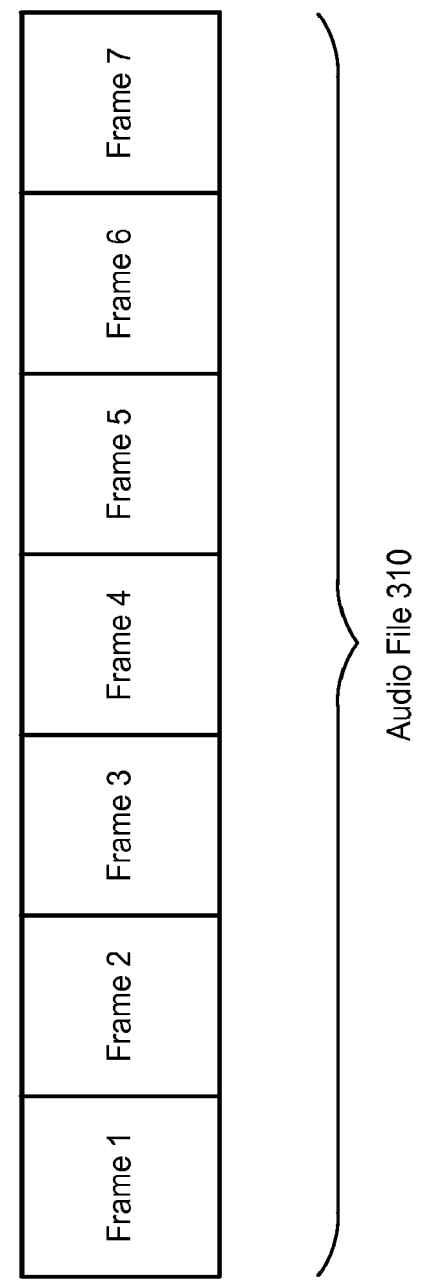

DYNAMIC BIT RATE ENCODING

FIELD

The present disclosure relates to systems and methods for performing dynamic bit rate encoding.

BACKGROUND

With the advancement of the Internet, a variety of online applications have been developed. Some applications include social networking applications, music uploading and downloading applications, and video uploading and downloading applications. Users are provided the flexibility of accessing their music and videos from anywhere in the world via a network. However, sometimes, quality of the music or video stays the same regardless of the network used to access the music or video.

It is in this context that embodiments arise.

SUMMARY

Various embodiments described in the present disclosure provide systems and methods for performing dynamic bit rate encoding. It should be appreciated that the embodiments can be implemented in numerous ways, such as, for example, a process, an apparatus, a system, a device or a method on a computer-readable medium. The embodiments are described below.

In some embodiments, when a change in a network that acts as a medium for accessing a media file occurs, there is a change in a bit rate with which a portion of the media file is accessed via the changed network. The change in the bit rate occurs when a client device requests the change or when a server or a network implements the change without receiving the request from the client device. Moreover, a segment of a media file that is received at the changed bit rate is stitched with a prior segment received at the old bit rate. The stitching provides a seamless listening or watching experience to a user.

In various embodiments, a method for performing bit rate encoding on a client device is described. The method includes receiving data indicating a change in a first connection speed that is associated with a first network. The change generates a second connection speed. The method further includes determining whether a media file is being downloaded in response to receiving the data indicating the change in the first connection speed. The method also includes determining that a current segment of the media file is being downloaded in response to determining that the media file is being downloaded. The current segment is downloaded at a first bit rate and the first bit rate is associated with the first connection speed. The method includes determining whether the media file includes a remaining segment to be downloaded in response to determining that the media file is being downloaded. The current segment precedes the remaining segment. The method further includes identifying a second bit rate based on the second connection speed in response to determining that the current segment is being downloaded and in response to determining that the remaining segment is to be downloaded. The method includes requesting the remaining segment at the second bit rate and receiving the remaining segment at the second bit rate. The method includes stitching the remaining segment with the current segment. The method is executed by one or more processors.

In several embodiments, a method for performing bit rate encoding on a server is described. The method includes receiving data notifying a change in connection speed that is associated with a first network, determining whether the notification of the change in the connection speed is received during communication of a media file at a first bit rate to a client device, and identifying a second bit rate based on the change in the connection speed. The method further includes determining whether the media file includes a first remaining segment and a second remaining segment to be sent to the client device in response to the notification of the change in the connection speed. The first remaining segment precedes the second remaining segment. The first remaining segment is to be sent at a first bit rate and the second remaining segment is to be sent at a second bit rate. The method includes stitching the second remaining segment with the first remaining segment of the media file and transmitting the first remaining segment at the first bit rate and the second remaining segment at the second bit rate to the client device. The method is executed by one or more processors.

In a number of embodiments, a client system for performing dynamic bit rate encoding is described. The system includes a network interface controller that is configured to receive data indicating a change in a first connection speed that is associated with a first network. The change generates a second connection speed. The system includes a processor that is coupled with the network interface controller. The processor is configured to determine whether a media file is being downloaded in response to receiving the data indicating the change in the first connection speed. The processor is further configured to determine that a current segment of the media file is downloaded in response to determining that the media file is being downloaded. The current segment is downloaded at a first bit rate, which is associated with the first connection speed. The processor is configured to determine whether the media file includes a remaining segment to be downloaded in response to determining that the media file is being downloaded. The current segment precedes the remaining segment. The processor is configured to identify a second bit rate based on the second connection speed in response to determining that the current segment is downloaded and the remaining segment is not downloaded. The network interface controller is configured to request the remaining segment at the second bit rate and is also configured to receive the remaining segment at the second bit rate. The processor is configured to stitch the remaining segment with the current segment.

In various embodiments, a method for performing bit rate encoding on a client device is described. The method includes receiving data of a file at a first bit rate from a network, receiving data of the file at a second bit rate, and stitching the data received at the second bit rate with the data received at the first bit rate to playback the file. The method is executed by one or more processors.

Other aspects will become apparent from the following detailed description, taken in conjunction with the accompanying drawings.

BRIEF DESCRIPTION OF THE DRAWINGS

Various embodiments described in the present disclosure may best be understood by reference to the following description taken in conjunction with the accompanying drawings.

FIG. 11 is a diagram of an audio frame, in accordance with various embodiments described in the present disclosure.

FIG. 12 is a diagram of an audio file, in accordance with several embodiments described in the present disclosure.

DETAILED DESCRIPTION

The following embodiments describe systems and methods for performing dynamic bit rate encoding.

It will be apparent, that the present embodiments may be practiced without some or all of these specific details. In other instances, well known process operations have not been described in detail in order not to unnecessarily obscure the present embodiments.

Figure 1:
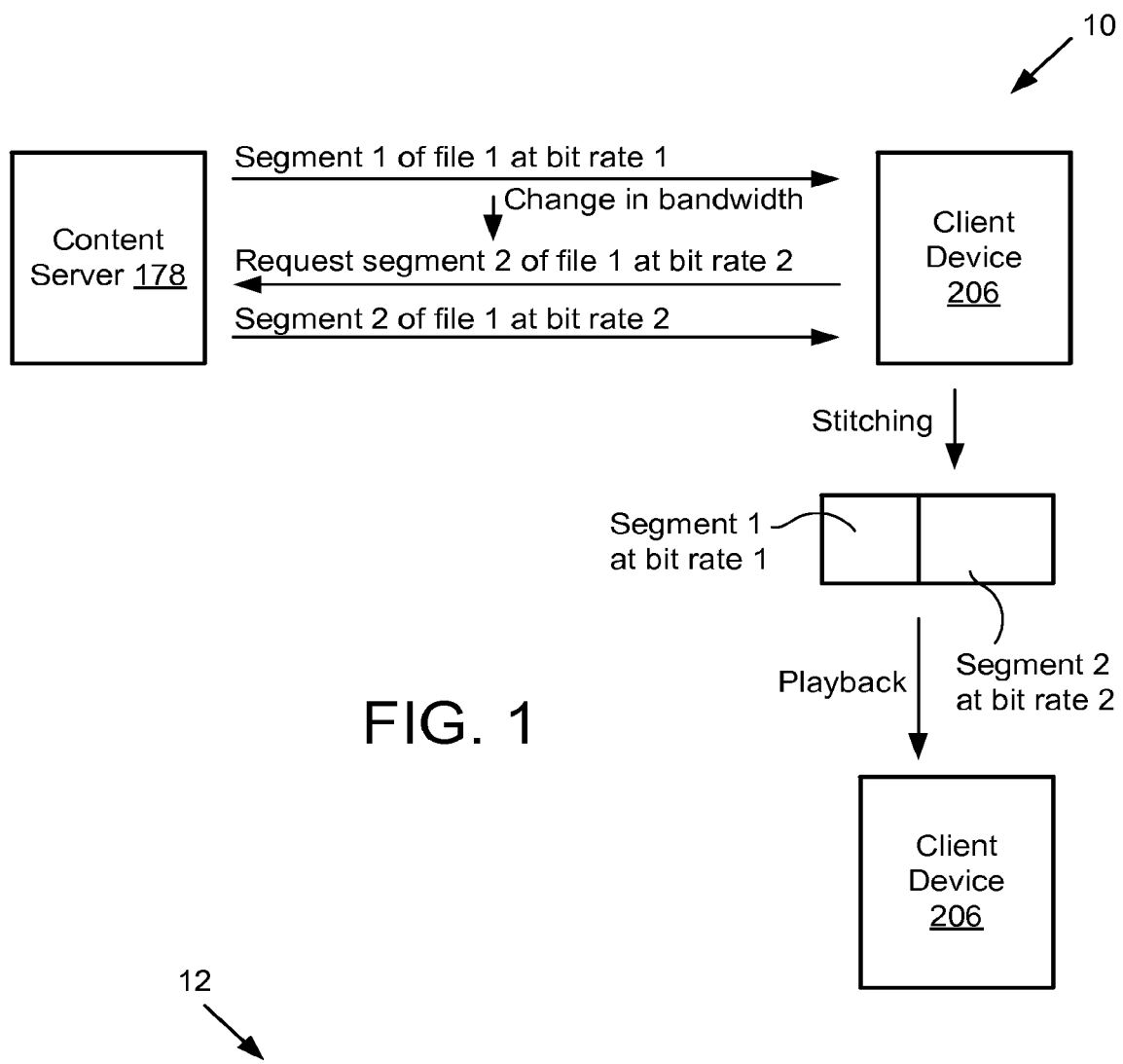
FIG. 1 is a block diagram of a system for performing dynamic bit rate encoding, in accordance with several embodiments described in the present disclosure.

FIG. 1 is a block diagram of an embodiment of a system 10 for performing dynamic bit rate encoding. A client device 206 requests a media file from a content server 178. Examples of content include elements of music. The elements are described below. A server, as used herein, is a physical server or a virtual machine. Examples of a client device include a tablet, a digital audio player, a video game console, a desktop computer, a laptop computer, a cell phone, a personal digital assistant, and a smart phone. Examples of a media file include an audio file, a video file, a text file, an animation file, and a file that includes a combination of audio, video, text, and animation. As another example, a media file includes data representing music. As yet another example, a media file includes data a song or data of a group of songs. As another example, a media file includes an MP3 file, a Moving Pictures Experts Group-2.5 (MPEG-2.5) Audio Layer III file, an MPEG-1 Audio Layer III file, or an MPEG-4 audio file. As another example, a media file uses a variable bit rate (VBR) that is accomplished via bit rate switching on a per-frame basis.

Music that is organized in the media file may be created by one or more artists. Music is a combination of sound and silence. Some common elements of music include pitch, lyrics rhythm, dynamics, and sonic qualities of timbre and texture.

In several embodiments, music has a start and an end. For example, a media file includes a data that represents a song that has a start and an end. As another example, the media file includes an introduction of a song, a verse of the song, and an end of the song. As yet another example, the media file includes introductions of multiple songs, verses of multiple songs, and ends of multiple songs.

Upon receiving the request for a media file, the content server 178 sends the media file to the client device 206. For example, the content server 178 sends a segment 1 of a file 1 to the client device 206 at a bit rate (BR) 1. An example of a segment includes an audio frame or a number of bits. The bit rate 1 is a bit rate at which bits of the segment 1 are sent from the content server 178.

Upon receiving the segment 1 at the bit rate 1, the client device 206 receives an indication of a change in a current digital bandwidth that accommodates the bit rate 1 to a new digital bandwidth that can accommodate a bit rate 2, which is different than the bit rate 1. The bit rate 2 is higher or lower than the bit rate 1. For example, the bit rate 2 conforms to a Wi-Fi™ standard and the bit rate 1 conforms to a first generation (1G), a second generation (2G), a third generation (3G) standard, or a fourth generation (4G0 standard. As another example, the bit rate 2 conforms to a higher generation standard than the bit rate 1. As yet another example, the bit rate 2 conforms to a Wi-Fi™ standard and the bit rate 1 conforms to a Code Division Multiple Access (CDMA) standard. As another example, the bit rate 1 conforms to a fourth generation (4G) standard and the bit rate 2 conforms to an Enhanced Data rates for GSM Evolution (EDGE) standard. GSM is an acronym for Global System for Mobile Communications. As yet another example, the bit rate 1 conforms to a telecommunications standard that has a lower digital bandwidth than a digital bandwidth of a telecommunications standard to which the bit rate 2 conforms. As another example, the bit rate 1 conforms to a telecommunications standard that has a higher digital bandwidth than a digital bandwidth of a telecommunications standard to which the bit rate 2 conforms. Examples of a telecommunications standard include CDMA, EDGE, 1G, 2G, 3G, 4G, and Wi-Fi.

In response to receiving the indication of the change in bandwidth, the client device 206 requests the content server 2 that a segment 2 of the file 1 be sent at the bit rate 2. In several embodiments, the segments 1 and 2 are parts of the same media file. For example, the segment 1 includes a first portion of a song and segment 2 includes a second portion of a song. As another example, the segment 1 includes a first piece of music and segment 2 includes the remaining piece of the music.

Upon receiving the request for the segment 2, the content server 178 sends the segment 2 at the bit rate 2 to the client device 206. The bit rate 2 is a bit rate at which bits of the segment 2 are sent from the content server 178.

The client device 206 receives the segment 2 at the bit rate 2 and stitches the segment 2 with the segment 1 to form an encoding. For example, the client device 206 determines a current time at which segment 1 ends playback and plays back the segment 2 at a next time. The current time precedes the next time. In various embodiments, a difference between the current time and the next time is that of a fraction of a second, such as, for example, a millisecond or a microsecond. The segments 1 and 2 are played back by the client device 206 after the stitching to provide a seamless experience to a user.

Figure 2:
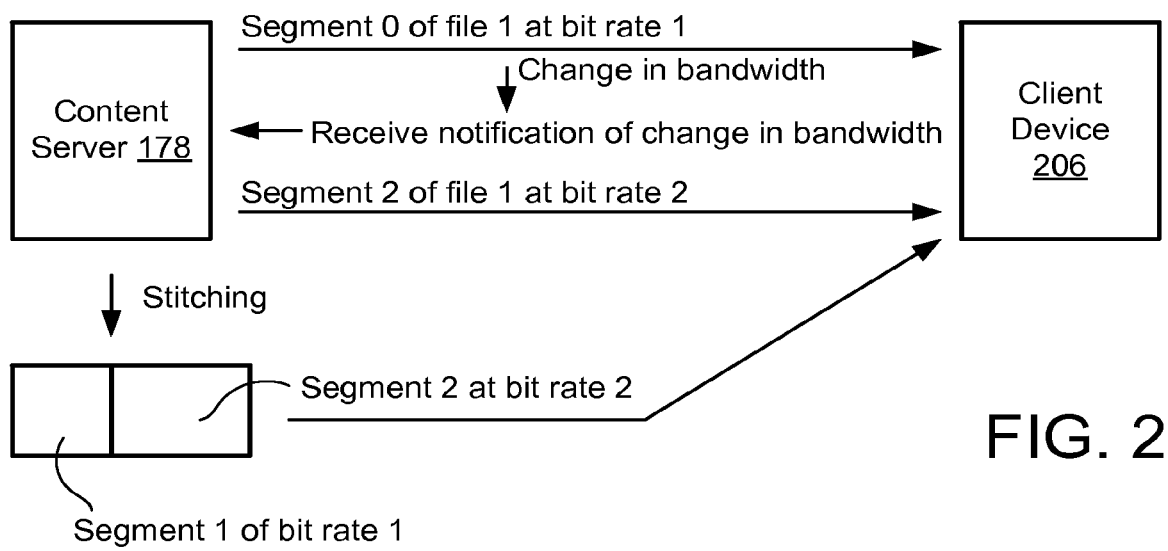
FIG. 2 is a block diagram of another system for performing dynamic bit rate encoding, in accordance with a number of embodiments described in the present disclosure.

FIG. 2 is a block diagram of an embodiment of a system 12 for performing dynamic bit rate encoding. When the content server 178 has finished sending a segment 0 to the client device 206 at the bit rate 1, there is a change in the current digital bandwidth to the new digital bandwidth. Upon determining that there is a change in the current digital bandwidth to the new digital bandwidth, the content server 178 stitches the segment 1 that is to be sent to the client device 206 at the bit rate 1 with the segment 2 that is to be sent to the client device 206 at the bit rate 2. After stitching, the content server 178 sends the segment 2 at the bit rate 2 and the segment 1 the bit rate 1 to the client device 206.

The content server 178 determines that the current bandwidth has changed to the new bandwidth based on a data notifying of the change from the client device 206 or from a network processor of a network, which is described below. As used herein, a network processor includes a processor, a processor of a router, a processor of a hub, or a processor of a bridge. A processor, as used herein, includes an application specific integrated circuit (ASIC), a field programmable gate array (FPGA), a microprocessor, or a central processing unit (CPU).

The client device 206 receives the segment 2 at the bit rate 2 and plays back the segment 2. The segment 2 is played back by the client device 206 after the stitching that is performed by the content server 178.

It should be noted that although various operations are described herein are performed by the content server 178, in several embodiments, the various operations are performed by more than one server.

Figure 3:
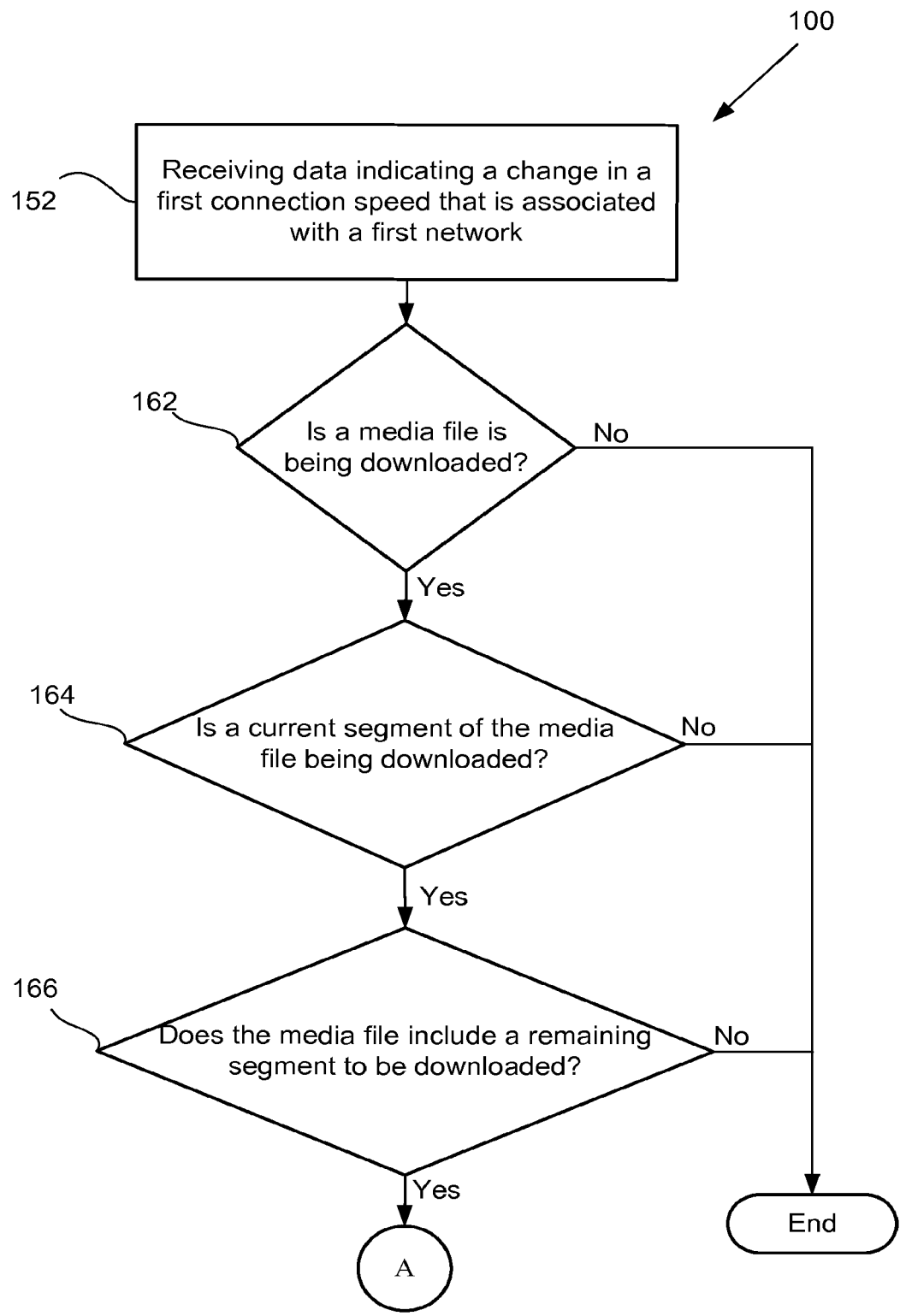
FIG. 3 is a flowchart of a method for performing dynamic bit encoding, in accordance with various embodiments described in the present disclosure.
Figure 4:
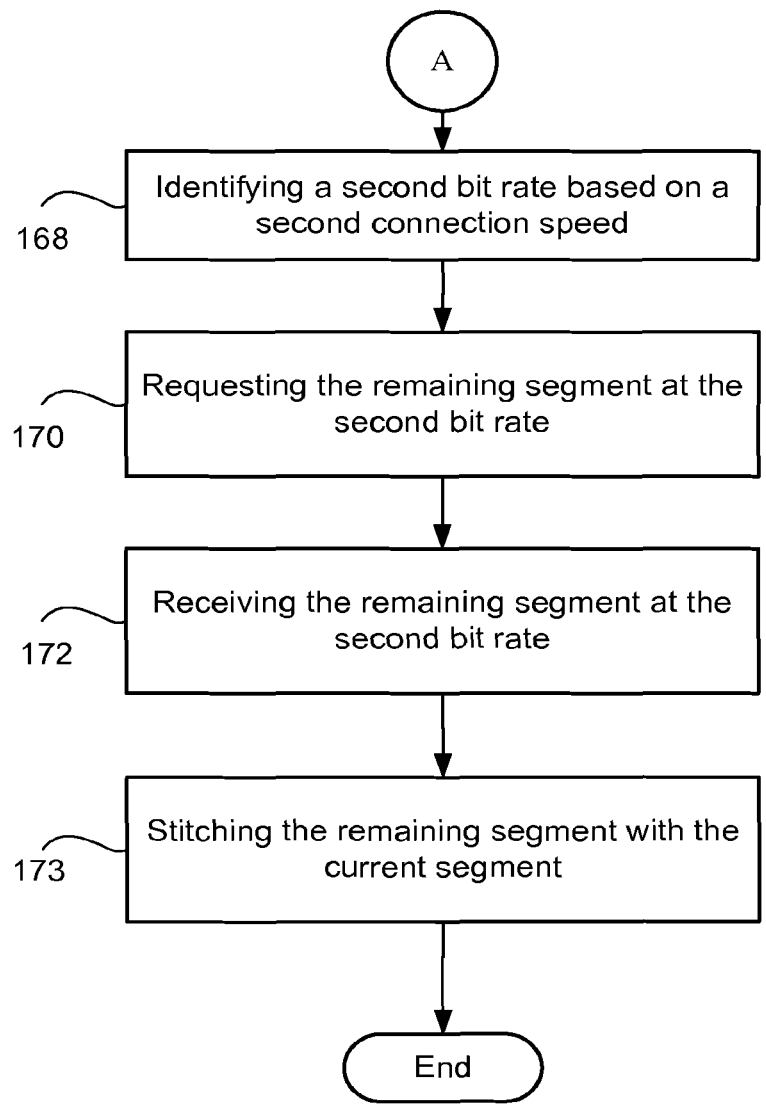
FIG. 4 is a continuation of the flowchart of FIG. 3, in accordance with several embodiments described in the present disclosure.
Figure 5:
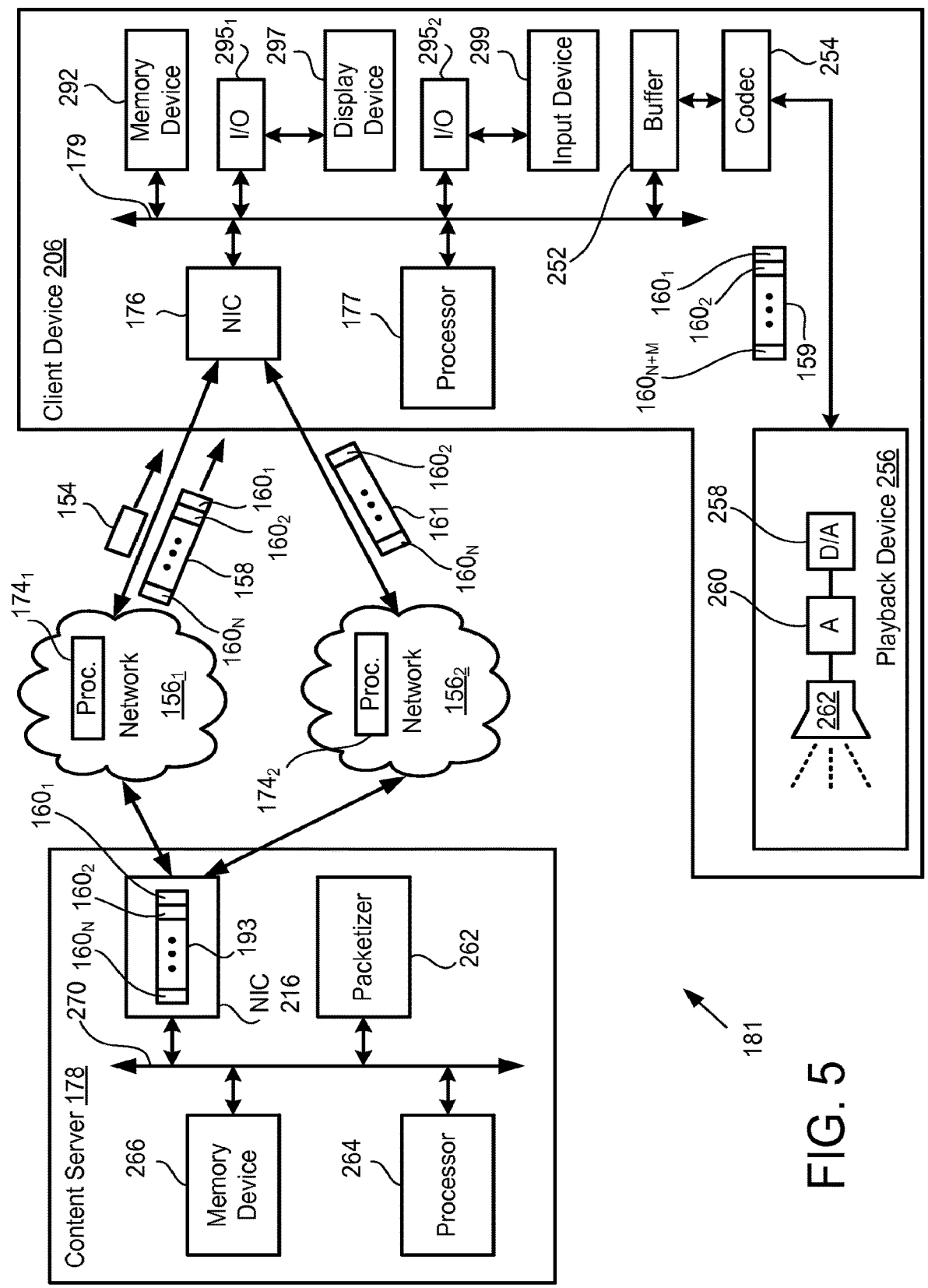
FIG. 5 is a block diagram of a system in which the method of FIGS. 3 and 4 is executed, in accordance with a number of embodiments described in the present disclosure.

FIG. 3 is a flowchart of an embodiment of a method 100 for performing dynamic bit encoding. FIG. 4 is a continuation of the flowchart of FIG. 3. FIG. 5 is a block diagram of an embodiment of a system 181 in which the method 100 is executed. The method 100 is executed by one or more processors, such as, for example, a processor 177 (FIG. 5), of the client device 206.

With reference to FIGS. 3 and 5, in an operation 152, data 154 is received by a network interface controller (NIC) 176 of the client device 206. Examples of a NIC include network adapter and a network interface card. In several embodiments, a modem is used instead of a NIC. The data 154 is received from a network processor 174$_1$ of a network 156$i$. As used herein, a network includes a local area network (LAN), a wide area network (WAN), or a combination thereof. For example, a network includes a wireless WAN (WWAN), a combination of WWAN and wireless LAN (WLAN), or a combination of wired WAN and wireless LAN.

The data 154 indicates a change in a first connection speed that is associated with a first network, such as, for example, the network 156$_1$. Examples of a connection speed include a digital bandwidth that includes a range of bit rates, a single bit rate, an optimal bit rate from among the bit rates, or a combination thereof. An example of an optimal bit rate includes a maximum bit rate from among the bit rates within a digital bandwidth, an average bit rate of the bit rates of the digital bandwidth, a mean of the bit rates of the digital bandwidth, a weighted mean of the bit rates of the digital bandwidth, or a combination thereof.

The first connection speed is associated with the network 156$_1$. For example, the network 156$_1$ conforms to a telecommunications standard that includes a bandwidth, an optimal bit rate, or a combination thereof.

The data 154 indicates that the first connection speed has changed to a second connection speed that is associated with a second network, such as, for example, a network 156$_2$. The network 156$_2$ conforms to a telecommunications standard that is different than a telecommunications standard to which the network 156$_1$ conforms. For example, the network 156$_1$ is a CDMA 1× network or an EDGE network or a 3G network or a 4G network and the network 156$_2$ is a Wi-Fi network. As another example, the network 156$_1$ is a Wi-Fi network and the network 156$_2$ is a CDMA 1× network or an EDGE network or a 3G network or a 4G network. As yet another example, the network 156$_1$ is a CDMA network and the network 156$_2$ is a 3G network or a 4G network. As another example, the network 156$_1$ allows digital bandwidths that are greater than digital bandwidths allowed by the network 156$_2$. As yet another example, the network 156$_2$ allows digital bandwidths that are greater than digital bandwidths allowed by the network 156$_1$. As another example, one or more connection speeds of the network 156$_2$ are different than one or more connection speeds of the network 156$_1$.

In several embodiments, the data 154 is received when the client device 206 is located closer to the network 156$_2$ compared to the network 156$_1$. As another example, the data 154 is received when the network 156$_2$ handles lesser network traffic, such as an amount of data, than that handled by the network 156$_1$.

In an operation 162, it is determined whether a media file 193 is being downloaded by the NIC 176. For example, the processor 177 determines whether the NIC 176 is receiving a payload of a packet 158. The payload includes segments ranging from 160$_1$ thru 160$_N$ of the media file 193, where N is an integer greater than zero. As another example, the processor 177 determines whether the payload of the packet 158 is stored within a queue of the NIC 176. The packet 158 is generated by a packetizer module 262 of the server 178.

A module, as used herein, includes software, hardware, or a combination thereof. For example, a module includes an ASIC, an FPGA, a microprocessor, or a CPU. As another example, a module includes a computer program that is stored within a computer-readable medium and is executed by a processor.

The frames 160$_1$ thru 160$_N$ are generated by a processor 264 of the content server 178 from content, such as, for example, media content, which is stored in a memory device 266 of the content server 178. Examples of a memory device include a random access memory (RAM), a read-only memory (ROM), or a combination thereof. For example, a memory device includes a flash memory, a hard disk, or a combination thereof.

The packet 158 is sent by a NIC 216 of the content server 178 via the network 156$_1$ when the NIC 216 receives a request for the media file 193 from the client device 206. The packetizer module 262, the processor 264, the memory device 266, and the NIC 216 are coupled with each other via a bus 270 of the content server 178. Examples of the packet 158 include a Wireless Access Protocol (WAP) packet. A packet includes content that is streamed from the content server 178 to the client device 206. In several embodiments, a packet includes a packet header and a payload. A payload of a packet includes a media file that includes a number of segments, e.g., frames. Contents of a media file are formatted, such as, for example, segmented, in a packet payload. In several embodiments, a media file is included within a packet. In various embodiments, a media file is included within multiple packets.

The determination of whether the media file 193 within the packet 158 is being downloaded by the NIC 176 is made in response to the reception of data 154. Upon determining that the media file 193 is not being downloaded, the method 100 ends.

On the other hand, upon determining that the media file 193 is being downloaded, in an operation 164, it is determined whether a current segment, e.g., the segment $160_1$, of the media file 193 is being downloaded. The current segment $160_1$ is an example of the segment 1 that is described above with reference to FIG. 1. The current segment $160_1$ is being downloaded at the bit rate BR1 from the content server 178 via the network $156_1$. For example, bits of the current segment $160_1$ are being downloaded by the NIC 176 at the bit rate BR1.

The bit rate BR1 is associated with the first connection speed. For example, the first connection speed includes multiple bit rates that conform to a telecommunications standard of the network $156_1$ and the bit rate BR1 is an optimal bit rate among the bit rates. As another example, the first connection speed includes a single bit rate, which is the bit rate BR1.

A segment of a media file is played back as soon as, such as, for example, within a fraction of a second after, the segment is downloaded, e.g., streamed, by the NIC 176. For example, the current segment $160_1$ is played back as soon as the current segment $160_1$ is downloaded.

The NIC 176 sends the current segment $160_1$ via a bus 179 to a buffer 252. The bus 179 is coupled with an input/output device (I/O) $295_1$ with an I/O $295_2$. Moreover, a display device 297 is coupled with the I/O $295_1$ and an input device 299 is coupled with the I/O $295_2$. Examples of a display device include a liquid crystal display (LCD), a light emitting diode display (LED), a cathode ray tube (CRT) display, and a plasma display. Examples of an input device include a mouse, a keyboard, a stylus, and a touch screen. In several embodiments, a touch screen is a part of a display device.

A codec module 254 accesses the current segment $160_1$ from the buffer 252 and sends the current segment $160_1$ to a playback device 256. A digital-to-analog converter (D/A) 258 receives the current segment $160_1$ and converts the current segment $160_1$ from a digital form to an analog form. An amplifier 260 amplifies the analog form of the current segment $160_1$. A speaker 262 converts electrical energy of the amplified analog form of the current segment $160_1$ into sound energy. In several embodiments, instead of speaker 262, any number of speakers is used to convert the electrical energy of the amplified analog form of the current segment $160_1$ into acoustic energy.

Upon determining that the current segment $160_1$ is not being downloaded, the method 100 ends. On the other hand, upon determining that the current segment $160_1$ is being downloaded, in an operation 166, it is determined whether the media file 193 includes any remaining segment, such as, for example, a remaining segment $160_2$, to be downloaded. For example, it is determined whether the media file 193 includes the remaining segment $160_2$ that is yet to be played back by the playback device 256. As another example, it is determined whether the current segment $160_1$ does not precede a boundary of the media file 193. As yet another example, it is determined whether the current segment $160_1$ includes a boundary of the media file 193. In several embodiments, a boundary of a media file is coded within one or more bits, which indicate an end of the media file. In various embodiments, a number of bits of the remaining segment $160_2$ that are received at the bit rate BR2 is different than a number of bits of the current segment $160_1$ that are received at the bit rate BR1.

The remaining segment $160_2$ is an example of the segment 2, which is described above with reference to FIG. 1. The current segment $160_1$ precedes the remaining segment $160_2$. For example, there is a lack of a segment between the current segment $160_1$ and the remaining segment $160_2$. Upon determining that the media file does not include any remaining segment to be downloaded, the method 100 ends.

With reference to FIGS. 4 and 5, on the other hand, upon determining that the media file 193 includes the remaining segment $160_2$ to be downloaded, in an operation 168, the bit rate BR2 is identified based on the second connection speed. For example, the bit rate BR2 is an optimal bit rate that conforms to a telecommunications standard of the network $156_2$. In this example, the bit rate BR2 is an optimal bit rate that is identified from the second connection speed. As another example, the second connection speed includes a single bit rate, which conforms to a telecommunications standard of the network $156_2$ and which includes the bit rate BR2.

In an operation 170, the remaining segment $160_2$ is requested by the NIC 176 to be sent at the bit rate BR2. The request for the remaining segment $160_2$ is sent to the NIC 216 via the network $156_1$. In several embodiments, the request for the remaining segment $160_2$ is sent to the NIC 216 via the network $156_2$.

The NIC 216 receives the request for the remaining segment $160_2$ and sends the request to the packetizer module 262. The packetizer module 262 generates a packet 161, which includes the segments $160_2$ thru $160_N$, and each segment $160_2$ thru $160_N$ has the bit rate BR2. In several embodiments, the segments $160_2$ thru $160_N$ have variable bit rates. For example, the segments $160_3$ thru $160_N$ have different bit rates than that of the segment $160_2$.

The packetizer module 262 sends the packet 161 via the network $156_2$ to the NIC 216. In several embodiments, the packetizer module 262 sends the packet 161 via the network $156_2$ at the bit rate BR2. The NIC 216 sends the packet 161 to the NIC 176.

In an operation 172, the remaining segment $160_2$ is received at the bit rate BR2. For example, the NIC 176 receives the segment $160_2$ of the packet 161 at the bit rate BR2.

The NIC 172 removes the remaining segment $160_2$ from the packet 161 and sends the remaining segment $160_2$, which is received at the bit rate BR2, to the buffer 252 via the bus 179. The codec module 254 retrieves the remaining segment $160_2$ from the buffer 252.

In an operation 173, the remaining segment $160_2$ is stitched with the current segment $160_1$ to form a media file 159. For example, the codec module 254 stitches the remaining segment $160_2$ which is received at the bit rate BR2 with the current segment $160_1$ which is received at the bit rate BR 1. As another example, the codec module 254 identifies a time t1 of an end of playback of the current segment $160_1$ and provides the remaining segment $160_2$, received at the bit rate BR2, to the playback device 256 to play back the remaining segment $160_2$ at a time t2. The time t1 precedes the time t2. For example, the time t2 is a fraction of a second after an occurrence of the time t1. As yet another example, the codec module 254 indicates within the remaining segment $160_2$ the time t2 of playback of the remaining segment $160_2$ and sends the remaining segment $160_2$ to the playback device 256.

The remaining segment $160_2$ is played back at the time t2. For example, the codec module 254 sends the remaining segment $160_2$ to the D/A 258, which converts the remaining segment $160_2$ from a digital form into an analog form. The amplifier 260 amplifies the analog form of the remaining segment $160_2$, and the speaker 262 converts the amplified analog form of the remaining segment $160_2$ into sound energy from electrical energy. As an example, the digital to analog conversion of the remaining segment $160_2$, the amplification of the analog form of the remaining segment $160_2$, and the conversion from electrical energy to sound energy of the amplified analog form is performed within the time t2. As another example, the conversion from electrical energy to sound energy of the amplified analog form of the remaining segment $160_2$ is performed at the time t2. When the remaining segment $160_2$ that is received at the bit rate BR2 is played back at the time t2 and the current segment $160_1$ that is received at the bit rate BR1 is played back at the time t1, a transition between the playback of the current segment $160_1$ that is received at the bit rate BR1 and the playback of the remaining segment $160_2$ that is received at the bit rate BR2 appears seamless to a listener of the media file.

It should be noted that in several embodiments, one or more elements of music within the segment $160_1$ that is received at the bit rate BR1 are different than one or more elements of music within the segment $160_2$ that is received at the bit rate BR2. For example, music within the segment $160_2$ that is received at the bit rate BR2 is of a different quality than music within the segment $160_1$ that is received at the bit rate BR1. In this example, the music that is received within the segment $160_1$ at the bit rate BR1 has the same lyrics as that of music that is received within the segment $160_2$ at the bit rate BR2. As another example, music within the segment $160_2$ that is received at the bit rate BR2 has a different tone or rhythm than music within the segment $160_1$ that is received at the bit rate BR1. In this example, the music that is received within the segment $160_1$ at the bit rate BR1 has the same lyrics as that of music that is received within the segment $160_2$ at the bit rate BR2. As another example, music within the segment $160_2$ that is received at the bit rate BR2 has a lossless compression and music within the segment $160_1$ that is received at the bit rate BR1 has a lossy compression. Any compression of content is performed by the processor 264 before the content is packetized by the packetizer module 262. In a lossy compression, some content is lost and in a lossless compression, there is no loss of content. As another example, music within the segment $160_2$ that is received at the bit rate BR2 has a lossy compression and music within the segment $160_1$ that is received at the bit rate BR1 has a lossless compression.

In several embodiments, between performing the operation 168 and 170 or between performing the operation 166 and the operation 168 or between performing the operation 172 and the operation 173, the processor 177 of the client device 206 determines whether a difference in a group of elements of music within the current segment $160_1$ that is received at the bit rate BR1 and a group of elements of music within the remaining segment $160_2$ that is received at the bit rate BR1 satisfies, such as, for example, meets or exceeds, a threshold, which is stored in a memory device 292 of the client device 206. A group of elements includes one or more elements. Examples of the threshold include a magnitude of pitch, rhythm, tone, or of any other element of music. An example of a magnitude of lyrics includes a number of alphabets within a lyric.

In various embodiments, upon determining that the difference does not meet the threshold, the processor 177 controls the NIC 176 to avoid sending the request to receive the remaining segment $160_2$ at the bit rate BR2. On the other hand, in these embodiments, upon determining that the difference satisfies the threshold, the processor 177 allows the NIC 176 to perform the operation 170 of requesting the remaining segment $160_2$ at the bit rate BR2. The satisfaction of the threshold allows stitching of the remaining segment $160_2$ having the bit rate BR2 with the current segment $160_1$ having the bit rate 1 at a time of a noticeable change in one or more elements of music. The stitching based on the threshold allows to reduce a chance of occurrence of the noticeable change.

In several embodiments, upon determining that the difference does not meet the threshold, the processor 177 avoids performing the operation 173 of stitching the remaining segment with the current segment. On the other hand, in these embodiments, upon determining that the difference satisfies the threshold, the processor 177 performs the operation 173 of stitching the remaining segment with the current segment.

It should be noted that in several embodiments, data that is stored in a memory device of a client device or a server can be stored in multiple memory devices of the client device or the server. For example, data that is stored in the memory device 266 can be stored in any number of memory devices of the content server 178. Similarly, in various embodiments, operations described herein as being performed by one processor of a client device or a server can be performed by multiple processors of the client device or the server. For example, in several embodiments, the content server 178 includes more than one processor that performs the operations that are performed by the processor 264.

Figure 6:
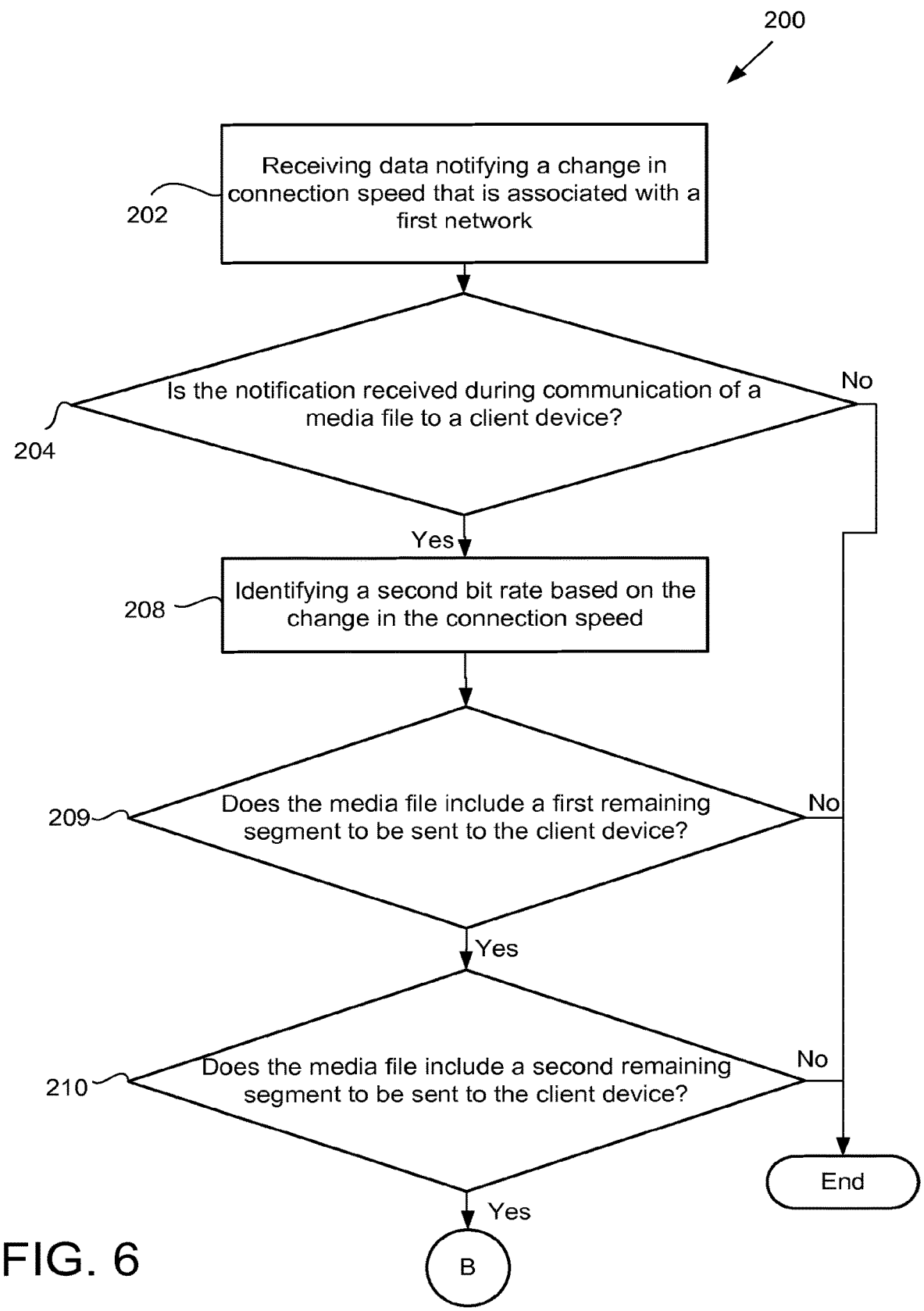
FIG. 6 is a flowchart of a method for facilitating dynamic bit rate encoding, in accordance with various embodiments described in the present disclosure.
Figure 7:
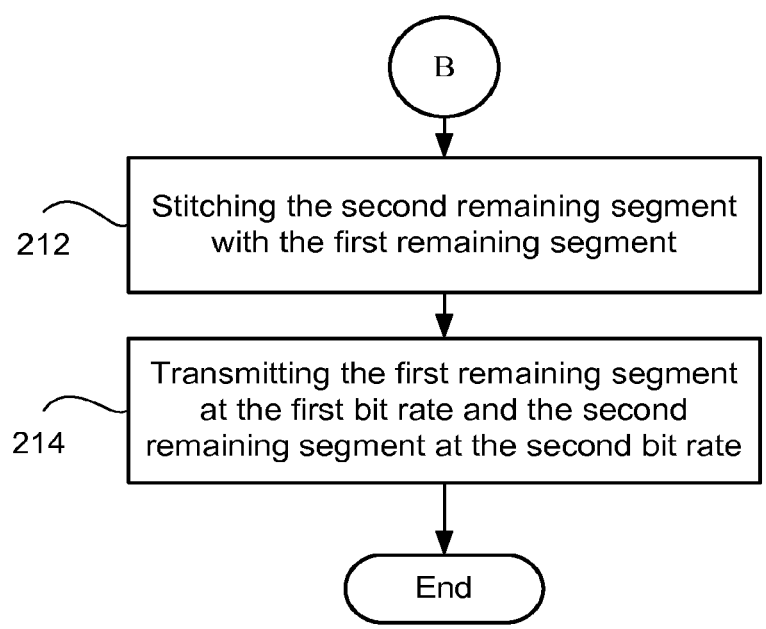
FIG. 7 is a continuation of the flowchart of the method of FIG. 6, in accordance with a number of embodiments described in the present disclosure.
Figure 8:
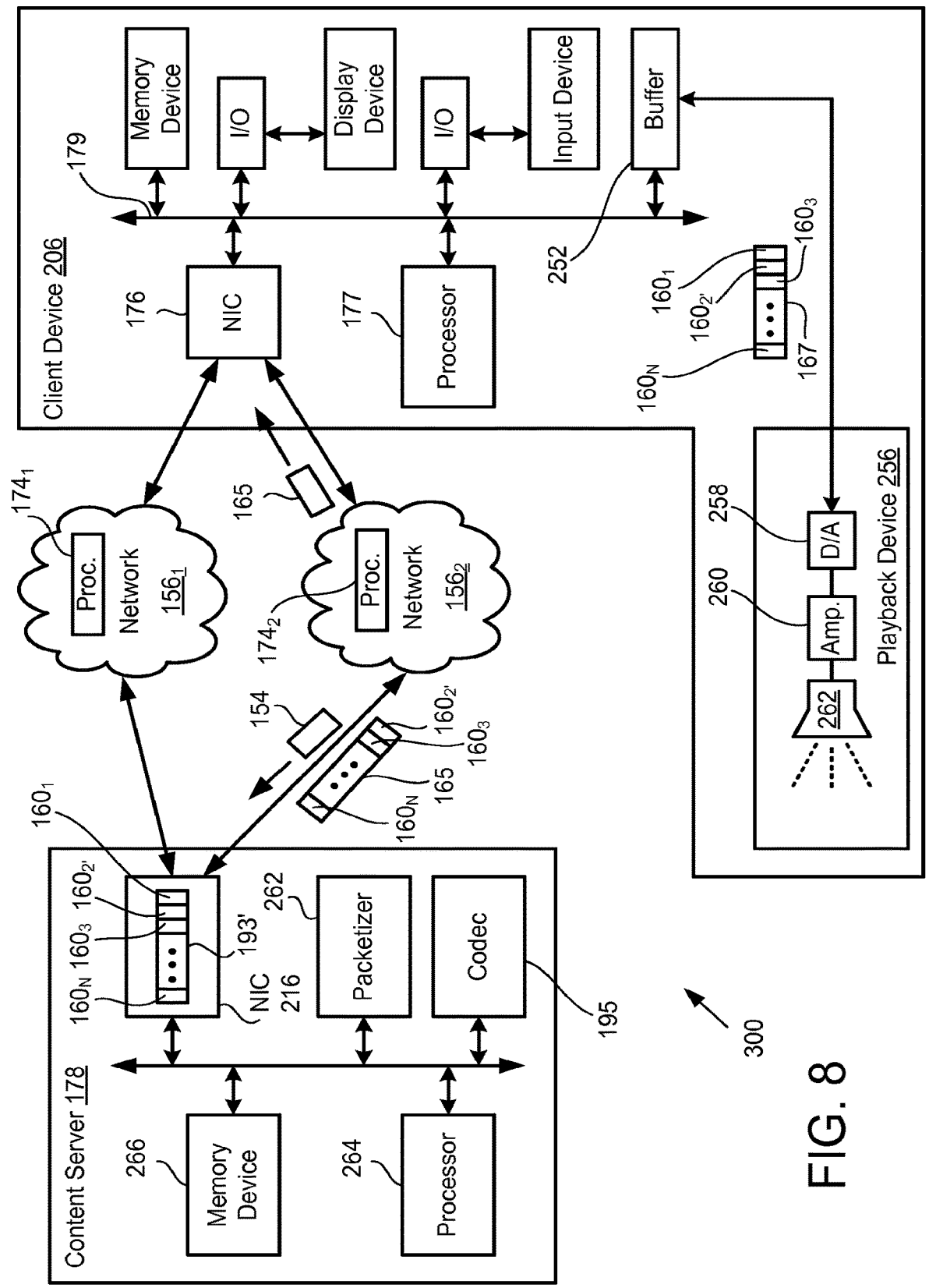
FIG. 8 is a block diagram of a system in which the method of FIGS. 6 and 7 is executed, in accordance with several embodiments described in the present disclosure.

FIG. 6 is a flowchart of an embodiment of a method 200 for facilitating dynamic bit rate encoding. FIG. 7 is a continuation of the flowchart of the method 200. FIG. 8 is a block diagram of an embodiment of a system 300 in which the method 200 is executed. The method 200 is executed by one or more processors, such as, for example, the processor 264, of the content server 178.

In an operation 202, the data 154 is received. The data 154 is received from the NIC 176 of the client device 206 or from the network processor $174_2$. When data 154 is received by the NIC 216 from the network processor $174_2$, the data 154 is not received from the NIC 176 via the network processor $174_2$.

In several embodiments, the data 154 is received from the network processor $174_1$. In these embodiments, when data 154 is received by the NIC 216 from the network processor $174_1$, the data 154 is not received from the NIC 176 via the network processor $174_1$.

Upon receiving the data 154, it is determined in operation 204, whether the data 154 is received during communication of a media file 193' to the client device 206. For example, the processor 264 determines whether data 154 is received by the NIC 216 at a time media file 193' is sent from the NIC 216 to the client device 206 via the network $156_1$. As another example, the processor 264 determines whether the data 154 is received by the NIC 216 at a time the media file 193' is stored within a queue of the NIC 216. As yet another example, the processor 264 determines whether the data 154 is being received by the NIC 216 at a time the current segment $160_1$ is communicated by the NIC 216 via the network $156_1$ to the NIC 176. The media file 193' is similar to the multimedia file 193 except that the media file 193 'includes a segment $160_2$' instead of the segment $160_2$.

Upon determining that the data 154 is not received during communication of the media file 193' to the client device 206, the method 200 ends. On the other hand, upon determining that the data 154 is received by the NIC 216 during communication of the media file 193' by the NIC 216, in an operation 208, the bit rate BR2 is identified based on the second connection speed. For example, the processor 264 identifies an optimal bit rate from among bit rates of the telecommunications standard of the network $156_2$. In this example, the identified bit rate is the bit rate BR2. As another example, the processor 264 determines that a single bit rate of the telecommunications standard of the network $156_2$ is the bit rate BR2.

In an operation 209, it is determined whether the media file 193' includes any remaining segment, e.g., a first remaining segment $160_2'$, to be sent via the network $156_1$ to the client device 206 at the bit rate BR1. For example, it is determined whether the first remaining segment $160_2'$ is not yet sent by the NIC 216 to the client device 206 via the network $156_1$. As another example, it is determined whether all bits of the first remaining segment $160_2'$ are scheduled to be sent by the NIC 216. The bits of the first remaining segment $160_2'$ are stored within a queue of the NIC 216 after being scheduled to be sent via the network $156_1$ to the client device 206. In several embodiments, the processor 264 performs the scheduling. In various embodiments, a scheduler module within the NIC 264 performs the scheduling. Upon determining that the media file 193 does not include a remaining segment to be sent, the method 200 ends.

On the other hand, upon determining that the media file 193' includes at least one, e.g., the first remaining segment $160_2'$, to be sent at the bit rate BR1, in an operation 210, it is determined whether the media file 193' includes any remaining segment, such as, for example, a second remaining segment $160_3$, to be sent to the client device 206 at the bit rate BR2 via the network $156_2$. For example, it is determined whether the first remaining segment $160_2'$ precedes the boundary of the media file 193. When the first remaining segment $160_2'$ precedes the boundary of the media file, there are no remaining segments to be sent by the NIC 216 after sending the first remaining segment $160_2'$. As another example, it is determined whether the first remaining segment $160_2'$ includes a boundary of the media file 193. Upon determining that the first remaining segment $160_2'$ that is to be sent at the bit rate BR1 does not precede any remaining segment of the media file 193, the method 200 ends.

With reference to FIGS. 7 and 8, on the other hand, upon determining that the first remaining segment $160_2'$ that is sent at the bit rate BR1 precedes the second remaining segment $160_3$, in an operation 212, stitching of the second remaining segment $160_3$ having the bit rate BR2 with the first remaining segment $160_2'$ having the bit rate BR1 is performed. For example, a codec 195 of the content server 178 provides a time t4 at which the second remaining segment $160_3$ is to be played back at the playback device 256. In this example, the first remaining segment $160_2'$ is to finish playing back at a time t3, which is received from the client device 206. The time t3 precedes the time t4. In various embodiments, a difference between the time t3 and the time t4 is that of a fraction of a second, such as, for example, a millisecond or a microsecond. In this example, the time t4 is stored within the second remaining segment $160_3$ having the bit rate BR2.

Moreover, the packetizer module 262 generates a packet 165 that includes the first remaining segment $160_2'$ having the bit rate BR1 and the second remaining segment $160_3$ having the bit rate BR2. In several embodiments, the packet 165 includes a number of segments $160_2'$ and $160_3$ thru $160_N$, which have variable bit rates. The NIC 216 sends the packet 165 via the network $156_2$ to the NIC 176. In an operation 214, the first remaining segment remaining segment $160_2'$ is transmitted by the NIC 216 at BR1 and the second remaining segment $160_3$ is transmitted by the NIC 216 at BR2 to the client device 206. The segments $160_2'$ and $160_3$ are transmitted via the network $174_2$.

The NIC 176 receives the packet 165 and converts the packet 165 into a media file 167. The media file 167 includes the current segment $160_1$ having the bit rate BR1, the remaining segment $160_2'$ having the bit rate BR1, and the remaining segment $160_3$ having the bit rate BR2. Upon receiving the media file 159, the processor 177 stores the media file 167 within the buffer 252. The playback device 256 retrieves the media file 167 and plays back the second remaining segment $160_3$ at the time t4.

In several embodiments, between performing the operation 210 and 212, the processor 264 of the content server 178 determines whether a difference in a group of elements of music within the first remaining segment $160_2'$ that is to be sent at the bit rate BR1 and a group of elements of music within the second remaining segment $160_3$ that is to be sent at the bit rate BR2 satisfies the threshold, which is stored in the memory device 266 of the content server 178. Upon determining that the difference does not meet the threshold, the processor 264 controls the NIC 216 to avoid stitching the second remaining segment $160_3$ with the first remaining segment $160_2'$. On the other hand, upon determining that the difference satisfies the threshold, the processor 264 allows the NIC 216 to perform the operation 212 of stitching the second remaining segment $160_3$ having the bit rate BR2 with the first remaining segment $160_2'$ having the bit rate BR1.

In various embodiments, instead of determining whether the media file 193' includes any remaining segment in the operation 209, it is determined whether the media file 193' includes a remaining segment that is a pre-determined number of segments following the current segment $160_1$ in the media file 193'. The pre-determined number is stored within the memory device 266 of the content server 178. In several embodiments, the pre-determined number is generated by the processor 264 of the content server 178 to allow time to stitch two remaining segments to be sent to the client device client device 206. For example, if it takes an x amount of time to send a y number of segments after the current segment $160_1$ is sent to the client device 206, the processor 264 identifies a segment after the y number of segments as a first remaining segment or a second remaining segment. In this example, the x amount of time is an amount of time taken to stitch the first remaining segment with the second remaining segment. As another example, if it takes an x amount of time to send a y number of segments after the current segment $160_1$ is sent to the client device 206, the processor 264 identifies a segment immediately following the y number of segments as a first remaining segment or a second remaining segment. In this example, the x amount of time is an amount of time taken to stitch the first remaining segment with the second remaining segment.

Figure 9:
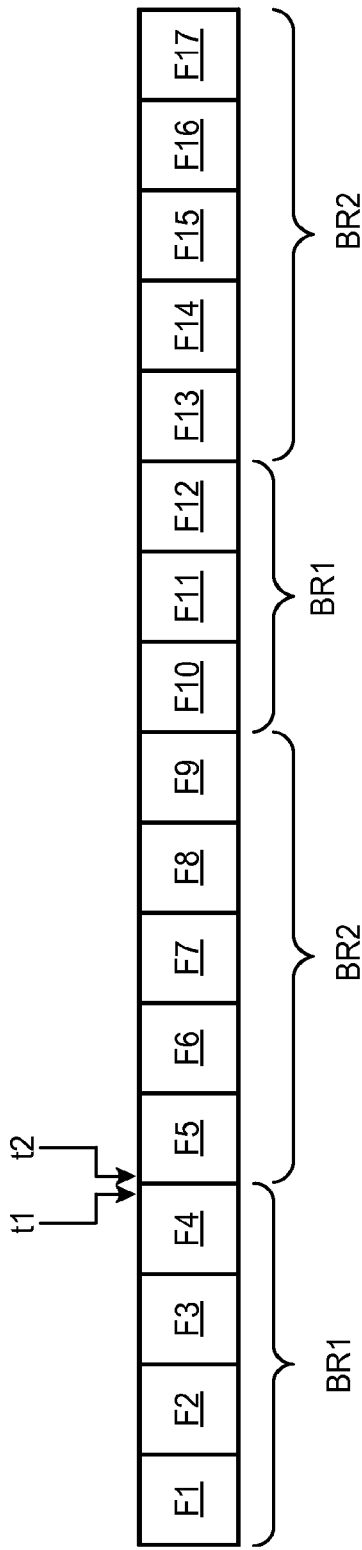
FIG. 9 is a diagram of a data stream that includes multiple frames, in accordance with various embodiments described in the present disclosure.

FIG. 9 is a diagram of an embodiment of a data stream that includes frames F1 thru F17. A first number of frames, such as, for example, frames F1 thru F4, are sent by the NIC 216 via the network $156_1$ (FIGS. 5 and 8) at the bit rate BR1 to the NIC 176. A second number of frames, such as, for example, frames F5 thru F9, are sent by the NIC 216 via the network $156_2$ at the bit rate BR2 to the NIC 176. Moreover, a third number of frames, such as, for example, frames F10 thru F12, are sent by the NIC 216 via the network $156_1$ at the bit rate BR1 to the NIC 176. A fourth number of frames, such as, for example, frames F13 thru F17, are sent by the NIC 216 via the network $156_2$ at the bit rate BR2 to the NIC 176.

It should be noted that in several embodiments, the first number is the same as one or more of the second, third, and fourth numbers. In various embodiments, the first number is an integer greater than zero and other than four. In several embodiments, the second number is an integer greater than zero and other than five. In a number of embodiments, the third number is an integer greater than zero and other than three. In several embodiments, the fourth number is an integer greater than zero and other than five. In various embodiments, the first number is the same as one or more of the second, third, and fourth numbers.

In several embodiments, the frames F1 thru F9 are within the same media file. In various embodiments, the frames F1 thru F17 are within the same media file.

The codec module 195 or 254 stitches the frame F5 with the frame F4. For example, when the frame F4 has finished playing back at the time t1, the frame F5 begins playing back at the time F5. Similarly, the frame F10 is stitched with the frame F9 by the codec module 195 or 254 and the frame F13 is stitched with the frame F12 by the codec module 195 or 254.

Figure 10:
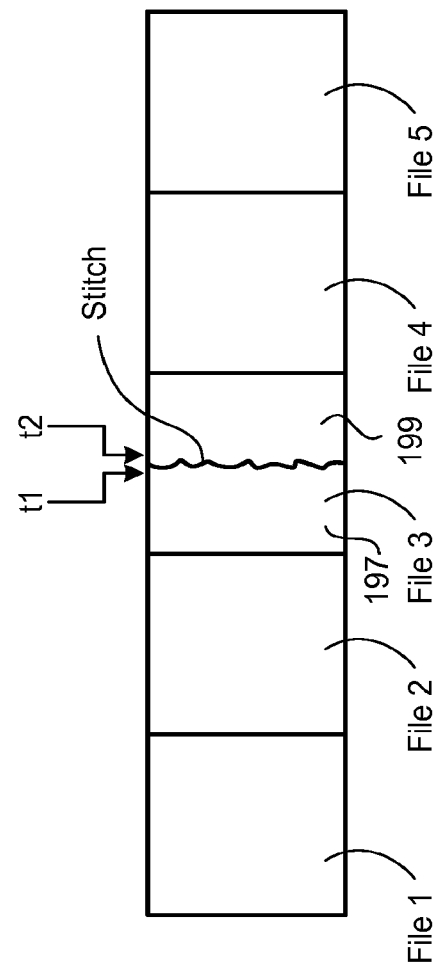
FIG. 10 is a diagram of a data stream that includes multiple media files, in accordance with a number of embodiments described in the present disclosure.

FIG. 10 is a diagram of an embodiment of a data stream that includes multiple media files 1 thru file 5. Although five files are shown in FIG. 10, in several embodiments, any number of files is used.

As shown, stitching occurs within the media file 3. For example, the codec module 195 or 254 (FIGS. 5 and 8) stitches a first frame of media file 3 with a second frame of the media file 3. The first frame has a different bit rate than that of the second frame. The first frame precedes the second frame. A portion 197 that includes one or more frames of the file 3 and another portion 199 that includes one or more frames of the file 3 are stitched to provide a seamless transition between the portions 197 and 199. The first portion 197 includes the first frame and the second portion 199 includes the second frame. In several embodiments, the first and second frames are audio frames.

FIG. 11 is a diagram of an embodiment of an audio frame 304. The audio frame 304 includes a frame header 306 and a frame payload, which includes media information 308. For example, the frame payload includes music data that is played back to listen to music. In various embodiments, the frame header 306 includes a bit rate of the audio frame 304. In several embodiments, the frame header 306 includes a frame sync, a layer description, a bit indicating whether the audio frame 304 is protected by a cyclic redundancy check (CRC), a bit rate of the audio frame 304, a bit indicating whether the audio frame 304 is padded, a bit indicating a channel mode, a bit indicating whether a media file that includes the audio frame 304 is copyrighted, a bit indicating whether the media file is a copy or an original, or a combination thereof. In various embodiments, the audio frame 304 is a frame of an MPEG file.

FIG. 12 is a diagram of an embodiment of an audio file 310. The audio file 310 includes frames 1 thru 7. Each of frames 1 thru 7 is a VBR frame. For example, a bit rate of the frame 1 is independent of a bit rate of the frame 2. In various embodiments, a bit rate of the frame 1 is different than a bit rate of the frame 2. In various embodiments, the audio file 310 includes a file header that precedes the frame 1. The file header provides information about the frames 1 thru 7. For example, the file header provides a number of the frames 1 thru 7, whether the frames 1 thru 7 are fixed rate or VBR frames, a brief description of media information within the frames 1 thru 7, or a combination thereof.

Although the above-described embodiments are described with reference to two bit rates BR1 and BR2, in various embodiments, any number of bit rates can be used. For example, the codec module 254 stitches a segment that is received by the NIC 176 at a bit rate BR3 with a segment that is received by the NIC 176 at the bit rate BR2 and stitches a segment that is received by the NIC 176 at the bit rate BR3 with a segment that is received by the NIC 176 at the bit rate BR1. The segments that are received by the NIC 176 at the bit rate BR3 are received from the content server 178 via a network that conforms to a telecommunications standard and the telecommunications standard includes a connection speed from which the bit rate BR3 is identified.

Figure 13:
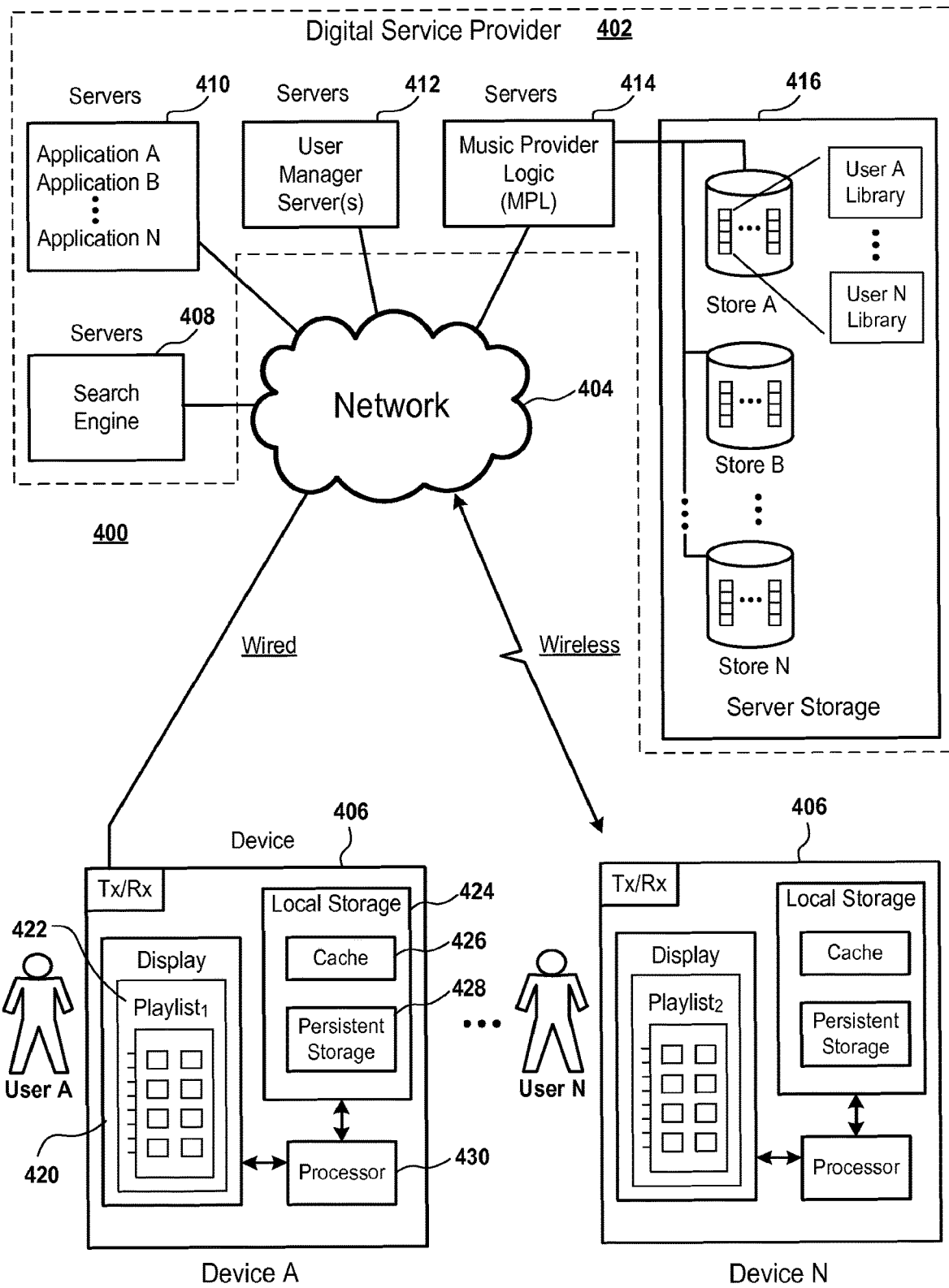
FIG. 13 illustrates a system diagram that defines methods for accessing and playing music files stored in a server storage, in accordance with various embodiments described in the present disclosure.

FIG. 13 illustrates a system 400 that defines methods for accessing and playing music files stored in a server storage, in accordance with various embodiments described in the present disclosure. The system 400 includes a plurality of servers that are connected to the network 404, which is an example of the network $156_1$ or $156_2$ (FIGS. 5 and 8). The plurality of servers and storage are, in several embodiments, part of a digital service provider 402. The digital service provider 402 is a system that can include a plurality of servers that can provide applications, services, digital content, and interconnectivity between systems, applications, users, and social networks. For example, the digital service provider 402 can include a search engine 408, a plurality of servers 410 that provide applications for various businesses, social, and technology related subject matter, servers that provide user management 412, and servers to provide music related services.

One example digital service provider 402 can be an entity, such as, for example, a corporation or a partnership. Other digital service providers can be more focused to provide only specific services, while others provide a variety of services for access, download, viewing, searching, etc. The content can vary greatly, but is commonly presented in digital format and displayed on monitors or screens of devices, computers, smart phones, tablets, etc.

The servers that provide music related services, in various embodiments, are illustrated by the music provider logic (MPL) 414, that executes over one or more servers that are connected to the network 404. The music provider logic 414 is shown connected to server storage 416. Server storage 416 is shown to include a plurality of storage systems, identified as store A, store B, and store N. The various storage systems that hold music data and music metadata, are provided with fast access to the network 404, for providing music data on demand to users requiring access to their music library stored in server storage 416. In several embodiments, users can access the server storage 416 by way of a plurality of devices 406. Each device 406 is an example of the client device 206 (FIGS. 5 and 8). The plurality of devices can include any type of device having a processor and memory, wired or wireless, portable or not portable. In the example illustrated in FIG. 13, user A is shown to have device 406 (device A). Device 406 is shown to include communication logic for transmitting and receiving data between device 406 and the network 404.

The communication logic (Tx/Rx) can include various types of network interface circuitry, radio-communication (such as, for example, wireless), cell tower communication, or interconnected wiring connected to Internet Service Providers (ISPs). Device 406 is also shown to include a display having a screen 420, local storage 424, and a processor 430. Local storage 424 can include cash memory 426, persistent storage 428, and other logic. In this example, device 406 is shown to include graphical icons (such as, for example, graphical user interfaces GUIs) that represent a play list. The screen 420 can be a touch-screen, or a display typically provided by a flat-panel display, a cathode ray tube (CRT), or other media capable of rendering a display. Still further, device 406 can have its display separate from the device, similar to a desktop computer or a laptop computer. Still further yet, device 406 can be in the form of a smart phone, a tablet computer, or hybrids that provide touch green capability in a portable form factor. One example device can include a portable phone device that runs an operating system and is provided with access to various applications (apps) that may be obtained over the network 404, and executed on the local portable device (such as, for example, smart phone, tablet, laptop, desktop, etc.).

In various embodiments, the user of device 406 can install an application that provides server storage of music files, and access to the music files from the device 406. Once the user's music files are uploaded to the server storage 416, the user's music files are associated to a library of the user. In several embodiments, a plurality of users can access the same application and can upload their own music files to create their own library, which will be stored in the server storage 416.

Each of such users can then access the server storage 416 through an application on their device 406 to render and play selected music files on their device, when the device 406 has access to the network 404 and associated servers of the music providing logic 414 and server storage 416. Accordingly, users can access the music application on their device 406, access all music files stored in server storage 416, arrange music titles in their music library into playlists, add music to the server storage 416, delete music from the server storage 416, and purchase music that is added to the server storage 416. These changes are maintained and managed by the music provider logic 414 and music provider logic 414 will provide access to the various users to their music files stored in the server storage 416, based on their selections during use of the application.

Figure 14:
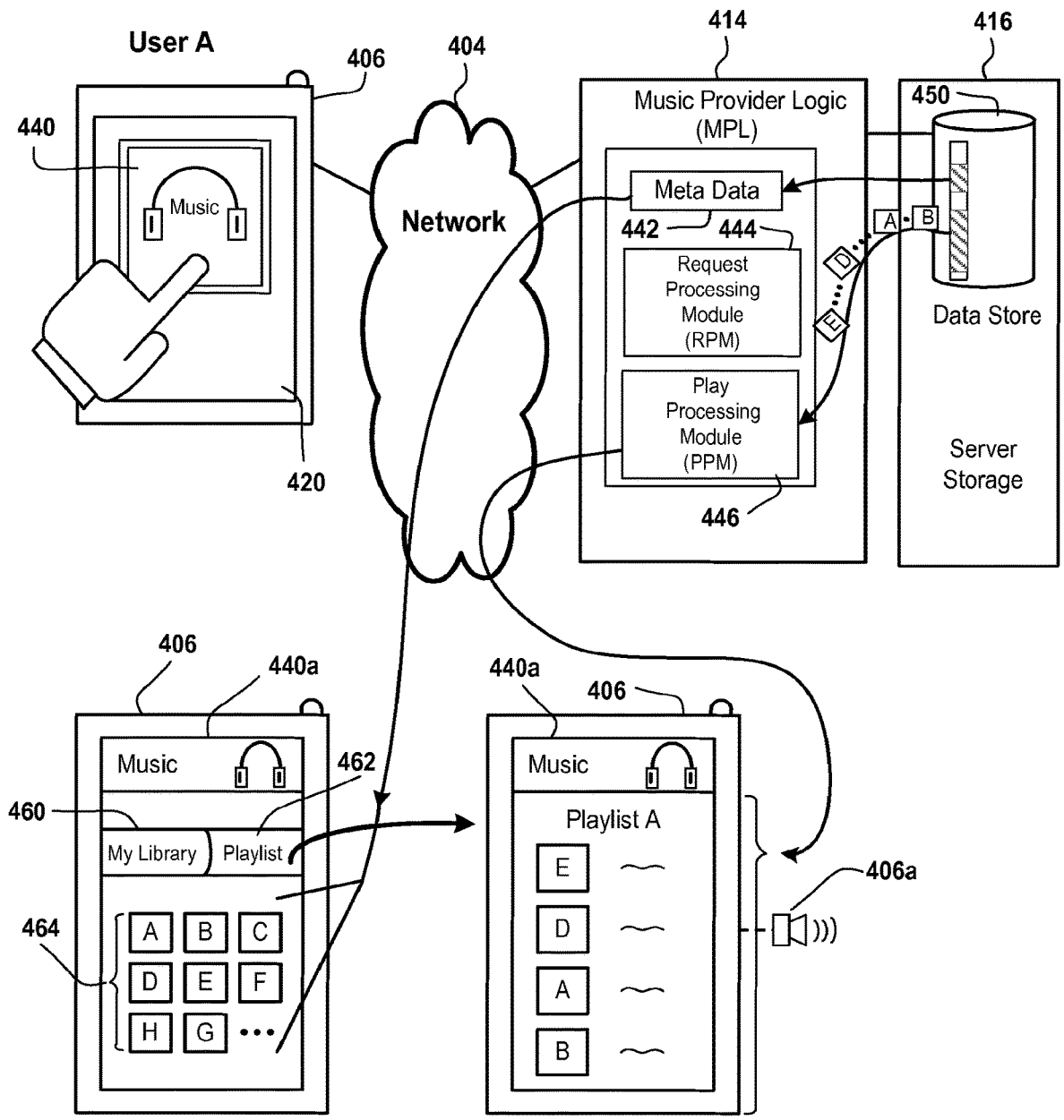
FIG. 14 illustrates how a user utilizes a device to access his or her music library stored in the server storage, in accordance with several embodiments described in the present disclosure.

FIG. 14 illustrates how user A utilizes a device 406 (such as, for example, smart phone) to access his or her music library stored in the server storage 416, in accordance with several embodiments described in the present disclosure. As shown, the device 406 will include a screen 420, and associated graphical icons that present a thumbnail of an application 440, associated with a music application. Application 440, as described herein, relates to an application that provides a user with access to his or her music library which has been previously added to the club music storage 416. If the user is a new user to the application 440, the new user can download application 440 to device 406 from at least one server 410 of the digital service provider 402.

Once the application has been downloaded and installed on device 406, the icon representing application 440 will be rendered on the display screen of device 406. Initially, the user will be prompted to select music to add to the server storage 416. The music may be added from files currently maintained by the user on his or her device 406, on other devices of the user, such as, for example, computers, other smart phone and or tablets, or other storage media. Additionally, the user can add music files that may be part of a music library maintained by another application. The other application may maintain a specific format for the music, and the music can be obtained and translated to standardize music files for addition to the server storage 416.

Once the user has managed his library to add, modify, or adjust the music files present in the server storage 416, the user can access application 440 and various options from graphical user interfaces provided on the screen 420 of device 406. In the illustrated example, device 406 will open application 440 through various graphical user interface screens, such as, for example, interface 440a. Interface 440a can include various menus, selection icons, configuration icons, displays, advertisements, buttons, listings, etc. In this example, the interface 440a may include an icon that lists the users library 460, the users play list 462, and music title icons 464. Music title icons can be represented by graphical artwork that represents artwork associated with the various music files present in the user's library. The users library is illustrated by title icons 464, shown as A-H.

The title icons 464 are rendered on the screen 420 upon obtaining metadata from the server storage 416, which may be present in data store 450. Music provider logic 414 will include request processing module 444 that manages the requests and communication between various users' applications 440 and the server storage 416. The request processing module (RPM) 444 is also in communication with a play processing module (PPM) 446. In order to render the title icons 464 on the screen of the device 406, the music processing logic 414 will utilize the request processing module 444 to obtain metadata 442 from the data store 450.

The metadata 442 will be the metadata associated with the various music files stored in data store 454 the requesting user. The metadata 442 provides information regarding each of the titles stored in the server storage 416, and sufficient information to render the title icons 464 on the screen of device 406, and provide text information, duration information, genre information, and other data that describes aspects or characteristics of the music files. As shown, when the user selects play list 462 on device 406, a play list graphical user interface is shown identifying particular songs that have been arranged by the user.

The playlist A represents various songs that were selected by the user to be part of playlist A. The user can have various playlists, and the selection of playlist A is only provided as one example of a playlist that includes music files that are played in the order E→D→A→B. Once the user selects a corresponding play button or clicks on one of the audio files in the playlist, the music files will begin to play in the order arranged and defined by the user in his or her playlist A.

Embodiments described in the present disclosure can be fabricated as computer-readable code on a non-transitory computer-readable storage medium, which is a storage device or a memory device. The non-transitory computer-readable storage medium holds data which can be read by a computer system. Examples of the non-transitory computer-readable storage medium include network attached storage (NAS), a memory device, a ROM, a RAM, a combination of RAM and ROM, a Compact Disc (CD), a Blu-Ray™ disc, a flash memory, a hard disk, and a magnetic tape. The non-transitory computer-readable storage medium may be distributed over a network-coupled computer system so that the computer-readable code is stored and executed in a distributed fashion.

Although the method operations were described in a specific order in the flowcharts of FIGS. 3, 4, 6, and 7, it should be understood that some operations may be performed in a different order, when the order of the operations do not affect the expected results. In addition, other operations may be included in the methods presented, and the operations may be performed by different entities in a distributed fashion, as long as the processing of the operations is performed in a desired way.

In addition, at least one operation of some methods performs physical manipulation of physical quantities, and some of the operations described herein are useful machine operations. Embodiments presented herein recite a device or apparatus. The apparatus is specially constructed for a purpose. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method comprising:
   receiving, at a server, a notification of a change in a connection speed that has been received during communication of a media file at a first bit rate to a client device;
   identifying, at the server, a variable second bit rate based on at least the change in the connection speed;
   determining, at the server, that the media file includes a first remaining segment and a second remaining segment to be transmitted to the client device in response to receiving the notification of the change in the connection speed, the first remaining segment preceding the second remaining segment, the first remaining segment to be transmitted at the first bit rate;
   in response to determining that the first remaining segment at the first bit rate and the second remaining segment at the variable second bit rate are to be transmitted to the client device, generating, at a packetizer of the server, a first group of elements that include at least one of audio or video characteristics of the media file within a portion of the first remaining segment that is to be transmitted at the first bit rate, and a second group of elements that include at least one of the audio or video characteristics of the media file within a portion of the second remaining segment to be transmitted at different bit rates of the variable second bit rate;
   in response to determining that a difference between the first group of elements and the second group of elements exceeds a music element threshold value, stitching the first remaining segment and the second remaining segment to form a stitched media file; and
   transmitting the stitched media file that includes the first remaining segment at the first bit rate and the second remaining segment at the variable second bit rate to the client device.

2. The method of claim 1, wherein the determining that the notification of the change in the connection speed is received comprises receiving, at the server, data that indicates a change from a bandwidth of the first network to a bandwidth of a second network.

3. The method of claim 1, further comprising:
   determining that the first remaining segment is to be transmitted by the server by determining that all bits of the first remaining segment are scheduled to be sent by a network interface controller of a server.

4. The method of claim 1, wherein determining that the media file includes the second remaining segment to be transmitted to the client device comprises determining that the first remaining segment does not precede a boundary of the media file.

5. The method of claim 1, further comprising:
   selecting the variable second bit rate as a maximum bit rate among all bit rates of a bandwidth of a second network.

6. The method of claim 1, wherein the second remaining segment is stitched with the first remaining segment based on a time at which the first remaining segment is to finish playing back at a client device.

7. The method of claim 6, further comprising:
   transmitting the stitched first remaining segment and the second remaining segment in a seamless manner.

8. The method of claim 1, wherein the media file includes a video file, an audio file, an image file, a text file, or a file that includes a combination of text, video, audio, and image.

9. The method of claim 1, wherein the media file includes an audio file, wherein the processor is configured to determine that a frame of the audio file is being received by the network interface controller.

10. A system comprising:
    a network interface controller to receive a notification of a change in a connection speed that has been received during communication of a media file at a first bit rate to a client device;
    a processor, coupled to the network interface controller, to identify a variable second bit rate based on at least the change in the connection speed;
    the processor to determine that the media file includes a first remaining segment and a second remaining segment to be transmitted to the client device in response to receiving the notification of the change in the connection speed, the first remaining segment preceding the second remaining segment, the first remaining segment to be transmitted at the first bit rate;
    a packetizer, communicatively coupled to the processor, to generate a first group of elements that include at least one of audio or video characteristics of the media file within a portion of the first remaining segment that is to be transmitted at the first bit rate, and a second group of elements that include at least one of the audio or video characteristics of the media file within a portion of the second remaining segment to be transmitted at different bit rates of the variable second bit rate in response to determining that the first remaining segment at the first bit rate and the second remaining segment at the variable second bit rate are to be transmitted to the client device;
    the processor to stitch the first remaining segment and the second remaining segment to form a stitched media file in response to determining that a difference between the first group of elements and the second group of elements exceeds a music element threshold value; and
    the network interface controller to transmit the stitched media file that includes the first remaining segment at the first bit rate and the second remaining segment at the variable second bit rate to the client device.

11. The system of claim 10, wherein the network interface controller is configured to receive data that the first connection speed has changed to the second connection speed, the first connection speed associated with the first network and the second connection speed associated with a second network.

12. The system of claim 10, wherein the processor determines that the first remaining segment is to be transmitted by the network interface controller by determining that all bits of the first remaining segment are scheduled to be sent by the network interface controller of a server.

13. The system of claim 10, wherein the processor determines that the media file includes the second remaining segment to be transmitted to the client device by determining that the first remaining segment does not precede a boundary of the media file.

14. The system of claim 10, wherein the processor selects the variable second bit rate as a maximum bit rate among all bit rates of a bandwidth of a second network.

15. The system of claim 10, wherein the second remaining segment is stitched with the first remaining segment based on a time at which the first remaining segment is to finish playing back at a client device.

16. The system of claim 15, wherein the network interface controller transmits the stitched first remaining segment and the second remaining segment in a seamless manner.

17. The system of claim 10, wherein the media file includes a video file, an audio file, an image file, a text file, or a file that includes a combination of text, video, audio, and image.

18. The system of claim 10, wherein the media file includes an audio file, wherein the processor is configured to determine that a frame of the audio file is being received by the network interface controller.

* * * * *